United States Patent Office 2,725,412
Patented Nov. 29, 1955

2,725,412

CHLORINATION OF 1,1-DICHLOROETHANE

Franklin Conrad, Baton Rouge, La., assignor to Ethyl Corporation, New York, N. Y., a corporation of Delaware No Drawing. Application June 14, 1954,
Serial No. 436,738

3 Claims. (Cl. 260—654)

This invention relates generally to the production of polychloroethylenes and more particularly to the manufacture of trichloroethylene and tetrachloroethylene by a thermal chlorination process.

Trichloroethylene and tetrachloroethylene are well-known compounds of commerce, being particularly valuable solvents and having other uses. They can be manufactured by chlorination of lower alkane or alkene hydrocarbons, such as methane, ethane or ethylene. Most frequently, they are produced by either a photochlorination or a thermal chlorination of methane. As an example of a thermal chlorination process British Patent 673,565 describes the chlorination of ethylene or ethylene dichloride carried out without a catalyst at a temperature within the range of 300–500° C. and in a fluidized bed reactor. The principal disadvantage of this process, as well as all other known processes, is the formation of a wide variety of impurities in the product, frequently as many as 8 to 10 components, which create many costly operational and separation problems. While this is the most important disadvantage of this process, it is also unsatisfactory in that it requires relatively costly feed materials, i. e. ethylene or ethylene dichloride. The formation of the several undesirable by-products also reduces the yield and economical utilization of the valuable feed materials. In addition to the separation problems created by the impurities, in many cases the products include solid impurities, such as hexachloroethane, which tend to plug the process equipment.

In spite of the difficulties encountered, thermal chlorination processes have several distinct advantages over other alternate processes, such as photochlorination. Among the disadvantages of the other processes are their sensitivity to reaction poisons, excessively long reaction periods, and expensive process equipment. The reaction is highly exothermic and hence photochemical processes require external heat transfer means, while at the same time supplying the reaction zone with a source of actinic light.

It is accordingly an object of this invention to provide an improved method for the manufacture of trichloroethylene and/or tetrachloroethylene. It is a further object to provide a process to selectively produce tri- and tetrachloroethylene containing a minimum number and quantity of impurities in order to permit easy and convenient recovery of a relatively pure product. Another object is to provide a highly economical process for the manufacture of trichloroethylene and tetrachloroethylene which is adapted to use relatively inexpensive feed materials; which provides an exceedingly high conversion of the feed material to the desired product; which does not require low temperature refrigeration; and which is simple and easy to control. Still another object is to provide a process which can selectively produce either tri- or tetrachloroethylene or mixtures thereof in the same equipment by merely varying the chlorine to organic feed ratio. Other objects and advantages of this invention will become apparent as the description proceeds.

It has now been found that an exceptionally high purity trichloroethylene and/or tetrachloroethylene can be produced without forming any large number or quantity of difficultly separable impurities. This improved process comprises chlorinating 1,1-dichloroethane, instead of the conventional 1,2-dichloroethane or ethane itself, at a temperature between about 350° to 550° C. and in a fluidized reaction zone. In order to accomplish this result, it has been found necessary to limit the residence time of the reactants within the reaction zone to materially shorter periods than heretofore employed, i. e. the necessary period is only about 10 seconds or less. The feed material 1,1-dichloroethane is not believed to have been previously employed in a chlorination process of this type. Moreover, it was not expected that this isomer would be suitable for use in such a process, much less that it would exhibit material advantage over the use of the 1,2-dichloroethane isomer.

In general, it is preferred to employ a pure 1,1-dichloroethane feed material in the process so as to obtain maximum benefits of the present invention. However, in some cases, it is suitable to have a feed stream which is contaminated with some other alkanes or chlorinated alkanes. When so contaminated it is preferred to use a feed material having less than about 10 percent of 1,2-dichloroethane or a similar quantity of other alkane impurities. A feed stream suitable for this process can be economically obtained as a by-product from an ethane chlorination process.

The temperature of the chlorination should be maintained between about 350° and 550° C. with temperatures between about 375° to 475° C. being preferred. Temperatures below 350° C. tend to give slow reaction rates and incomplete reaction of the feed materials. Temperatures above 550° C. result in excessive degradation of the product forming carbon, unsaturated components and high-boiling polymeric material.

The mole ratio of the chlorine feed to the 1,1-dichloroethane is important but not critical. In general, it can vary between about 1.5:1 to 3.5:1. The particular concentration employed determines to a large extent the relative concentrations of the desired trichloroethylene or tetrachloroethylene obtained, but in all cases within this range the undesired impurities are maintained at an absolute minimum. When it is desired to produce selectively trichloroethylene, the range of mole ratios of chlorine to 1,1-dichloroethane is about 1.5:1 to 2.6:1 and preferably between about 1.7:1 to 2.3:1. If it is desired to selectively produce tetrachloroethylene while eliminating or materially reducing the quantity of trichlorethylene in the product, a mole ratio is employed between 2.6:1 to 3.5:1 and preferably between 2.8:1 to 3.2:1. Over this entire range, the number of impurities obtained in the product does not normally exceed about 1 to 4 components, whereas surprisingly, when the conventional 1,2-dichloroethane is chlorinated under similar conditions, as many as 6 or more impurities are encountered, including several unsaturated hydrocarbon components.

The reaction or residence time is very important in carrying out this invention and should not normally exceed 10 seconds. In the more preferred embodiments of this invention, the residence time should not exceed about 8 seconds in order to maintain a highly pure product with a minimum number of troublesome and undesired impurities. It has been found that residence times as low as 1 second are suitable for the process, although it is preferred to employ an average residence time of above about 4 seconds. Residence times below 1 second tend to give a product having relatively few undesirable by-products, but the product contains considerable quantities of unreacted feed materials. Above 10 seconds, the impurities multiply and the product becomes very difficult to recover in relative pure form.

The fluidized bed can be of a conventional type employing any suitable fluidizing means or media and can utilize any desired temperature controlling means, either internal or external. The fluidized mass within the chlorination reactor is not critical but can be graphite, sand, alumina, pumice, silica, silicon carbide, porous earth, or any of several other well-known inert media.

The particle size of the media while not especially critical, is important. It is preferred to employ a material having an average particle size between about 25 to 250 microns, preferably between 75 and 175. Particles much less than 25 microns are sometimes suitable but tend to be entrained with the product vapors; whereas particles having a diameter above 250 microns result in mechanical difficulties in the fluidization technique.

A wide range of pressures in the chlorination reaction zone are suitable for this invention. In many cases, atmospheric pressure is desirable and has the advantage of eliminating expensive pressurized equipment. However, in many instances superatmospheric pressures are desirable in spite of the additional cost of the process equipment to improve the product distribution and to facilitate recovery of the desired trichloroethylene and tetrachloroethylene products.

The following examples describe typical embodiments of the process and are given to illustrate the invention in more details. All quantities in these examples are given in parts by weight.

*Example I*

A process embodying the features of this invention is carried out in a tubular fluidized bed reactor consisting of a reaction zone and a disengaging zone. In this example, a chlorine to 1,1-dichloroethane mole ratio of 1.8 is employed so as to produce a product predominating in trichloroethylene. The reaction zone is packed with 200 parts of graphite to form a bed whose static height is about ⅓ the length of the reaction zone and the graphite varying in size from 75 to 175 microns with an average particle size of 150 microns in diameter. The reactor section is heated to a temperature of about 450° C. and the gaseous reactants are then fed into the reaction zone. The chlorine is fed at the rate of 546 parts per hour and the 1,1-dichloroethane at the rate of 426 parts per hour. The flow of reactant gases is such that a total of 972 parts of reacting materials are introduced into the reactor per hour. The residence time of the reacting gases in the reaction zone is only 8 seconds. The temperature is maintained at about 450° C. The hydrogen chloride absorbed by water in a scrubber amounts to 418.0 parts. In the same period, 534.1 parts of chlorinated hydrocarbons are recovered consisting of the following chlorinated products:

| | Mole percent |
|---|---|
| Vinyl chloride | 5.8 |
| Dichloroethylenes | 5.6 |
| Trichloroethanes | 3.3 |
| Trichloroethylene | 81.4 |
| Tetrachloroethylene | 0.6 |
| Tetrachloroethanes | 3.3 |

In this particular run the product recovery is 98.1 percent base on the 1,1-dichloroethane fed to the reactor.

*Example II*

This example should be compared wtih Example I since it demonstrates the large number of undesired impurities resulting when 1,2-dichloroethane is chlorinated instead of the 1,1-dichloroethane, and also illustrates the longer time of chlorination necessary for complete chlorine utilization. The process of Example I is repeated except for the change in organic feed material and an increase in the residence time to 15 seconds. The chlorine to organic feed material mole ratio is maintained the same. Because of the longer residence time necessary to complete this reaction, the reactor capacity is only 320 parts per hour of chlorine and 247 parts per hour of 1,2-dichloroethane. The process is continued until 245 parts of hydrogen chloride are collected in the scrubbing zone. The condensable gases collected during this same period amount to 291 parts of a product which analyzes as follows:

| | Mole percent |
|---|---|
| Vinyl chloride | 1.6 |
| Dichloroethylenes | 10.3 |
| Trichloroethane | 6.7 |
| Trichloroethylene | 75.2 |
| Tetrachloroethylene | 3.5 |
| Tetrachloroethane | 1.5 |
| Pentachloroethane | 1.2 |

It should be noted that although the mole ratios employed in Example I and II are the same, it is apparent that the process of this invention (Example I) produce a product much superior to the product of Example II. Not only is an enhanced proportion of the desirable trichloroethylene obtained in Example I but the materially reduced number and quantity of undesired impurities in the product permits less complicated recovery of the desired trichloroethylene as compared to the product obtained from the process of Example II.

*Example III*

This example shows the effect of varying the chlorine to organic feed material mole ratio whereby a product predominating in tetrachloroethylene is produced.

The apparatus, conditions and procedure of this example are the same as in Example I except that 802 parts of chlorine and 373 parts of 1,1-dichloroethane are fed into the reactor. This corresponds to a chlorine to 1,1-dichloroethane mole ratio of 3.0. The flow of reactant gases through the reactor is such that the residence time within the reaction zone is approximately 7 seconds. The process is continued until 495 parts of hydrogen chloride are collected in the scrubbing zone. During this same period 582 parts of a condensable product is obtained which has the following composition:

| | Mole percent |
|---|---|
| Trichloroethylene | 3.7 |
| Tetrachloroethylene | 89.8 |
| Tetrachloroethane | 2.5 |
| Pentachloroethane | 4.0 |

*Example IV*

The inferior product obtained when the 1,2-dichloroethane isomer is chlorinated under comparable process conditions of Example III is shown in this example.

The apparatus, reaction conditions and procedure are the same as in Example III except that 1,2-dichloroethane is employed. The chlorine is fed at a rate of 312 parts per hour and the 1,2-dichloroethane at a rate of 145 parts per hour. In this run, because of the use of 1,2-dichloroethane, it is necessary to maintain a reaction contact time of approximately 18 seconds in order to completely react all of the chlorine.

The condensable product has the following composition:

| | Mole percent |
|---|---|
| Vinyl chloride | 0.1 |
| Vinylidene chloride | 0.3 |
| Trichloroethylene | 2.5 |
| Tetrachloroethylene | 86.5 |
| Tetrachloroethane | 1.6 |
| Pentachloroethane | 8.7 |
| Hexachloroethane | 0.3 |

It should be noted that five (5) separate undesirable impurities are produced in this example, along with the desired products, whereas under identical reaction conditions the process of this invention (Example III) produces only two (2) undesired impurities. Also, about twice as much of the valuable feed materials are converted to waste products as is produced in the process of this invention.

Equally good results are obtained in the above Examples I and III when reaction temperatures as low as 350° C. and as high as 550° C. are employed. Similarly, when the other inert solids such as sand, silicon carbide, porous earth, silica and alumina are employed in the place of graphite as a fluidizing media, the process produces similar advantageous results to those obtained in the above examples.

Similar excellent results are obtained in the above examples when the chlorine to organic feed material mole ratio employed in the process is varied down to 1.5 and up to 3.5. However, the particular percentage of trichloroethylene or tetrachloroethylene obtained in the product varies with the change in mole ratio, such that the proportion of tetrachloroethylene produced increases as the mole ratio increases.

The reaction or residence period can also be varied over a wide range. Reaction times of 2, 4, 6 and 10 seconds give excellent results similar to those of the above examples.

It is believed apparent from the foregoing that the present process permits the manufacture of trichloroethylene and/or tetrachloroethylene having an exceptionally low concentration and an absolute minimum number of undesired impurities. As shown above, when employing the present invention the number of different undesired materials produced by such a process can be reduced by as much as 60 to 70 percent. Similarly, when employing this process, it is possible to reduce the amount of feed materials converted to undesirable products by as much as 50 percent or more. The present process also selectively produces tri- and tetrachloroethylene while using the relatively inexpensive feed material, 1,1 dichloroethane. This process is exceedingly economical, easy and simple to control, and does not require any expensive or complex reaction equipment, such as low temperature refrigeration.

I claim:

1. An improved process for the manufacture of trichloroethylene and tetrachloroethylene which comprises reacting a gaseous mixture consisting essentially of chlorine and 1,1-dichloroethane in the molar proportion of 1.5 to 3.5 moles of chlorine to one mole of 1,1-dichloroethane in a fluidized reaction zone maintained at a temperature above about 350° C., the chlorination reaction period being not more than about 10 seconds, and separating the trichloroethylene and tetrachloroethylene from the reaction products.

2. A process as claimed in claim 1, wherein the reaction temperature is between about 375 to 475° C.

3. A process as claimed in claim 1, wherein the reaction period is between about 4 to 8 seconds.

References Cited in the file of this patent

UNITED STATES PATENTS

| | | |
|---|---|---|
| 2,577,388 | Warren | Dec. 4, 1951 |
| 2,676,997 | Brown et al. | Apr. 27, 1954 |
| 2,676,998 | Kuntz | Apr. 27, 1954 |